(12) United States Patent
Motika et al.

(10) Patent No.: US 8,769,360 B2
(45) Date of Patent: Jul. 1, 2014

(54) DYNAMIC DETECTION AND IDENTIFICATION OF THE FUNCTIONAL STATE OF MULTI-PROCESSOR CORES

(75) Inventors: Franco Motika, Hopewell Junction, NY (US); John D. Parker, Fidhkill, NY (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 12/904,205

(22) Filed: Oct. 14, 2010

(65) Prior Publication Data

US 2012/0096314 A1 Apr. 19, 2012

(51) Int. Cl.
*G06F 11/00* (2006.01)

(52) U.S. Cl.
USPC .............................. 714/733; 714/742; 714/11

(58) Field of Classification Search
USPC ..................... 714/11, 36, 733, 742
See application file for complete search history.

(56) References Cited

U.S. PATENT DOCUMENTS

| | | | |
|---|---|---|---|
| 3,569,731 A | 3/1971 | Gavira | |
| 3,614,609 A | 10/1971 | Grubel et al. | |
| 3,783,250 A | 1/1974 | Fletcher et al. | |
| 3,832,619 A | 8/1974 | Pollard | |
| 3,959,777 A | 5/1976 | Kimmel | |
| 4,001,787 A | 1/1977 | Kimmel | |
| 4,011,547 A | 3/1977 | Kimmel | |
| 4,224,910 A | 9/1980 | O'Brien | |
| 4,301,454 A | 11/1981 | Bailey | |
| 4,396,937 A | 8/1983 | Reitmeier et al. | |
| 4,661,310 A | 4/1987 | Cook et al. | |
| 4,752,869 A | 6/1988 | Miller et al. | |
| 4,804,515 A | 2/1989 | Crew et al. | |
| 4,873,685 A | 10/1989 | Millis, Jr. | |
| 4,915,326 A | 4/1990 | Plude | |
| 4,967,347 A * | 10/1990 | Smith et al. ..................... | 714/12 |
| 5,057,994 A | 10/1991 | Spiller | |
| 5,130,984 A | 7/1992 | Cisneros | |
| 5,157,654 A | 10/1992 | Cisneros | |
| 5,165,032 A | 11/1992 | Herbault | |
| 5,172,377 A | 12/1992 | Robinson et al. | |
| 5,327,553 A * | 7/1994 | Jewett et al. ...................... | 714/3 |
| 5,430,740 A | 7/1995 | Kivari et al. | |
| 5,450,460 A | 9/1995 | Stodieck | |
| 5,493,657 A | 2/1996 | Van Brunt et al. | |
| 5,498,912 A | 3/1996 | Templeman et al. | |
| 5,732,209 A * | 3/1998 | Vigil et al. ..................... | 714/30 |
| 5,778,204 A | 7/1998 | Van Brunt et al. | |
| 5,907,671 A | 5/1999 | Chen et al. | |
| 6,049,893 A * | 4/2000 | Liddell et al. ................... | 714/23 |
| 6,240,526 B1 * | 5/2001 | Petivan et al. ................... | 714/11 |
| 6,263,452 B1 * | 7/2001 | Jewett et al. ................. | 714/5.11 |
| 6,532,550 B1 | 3/2003 | Crew et al. | |
| 6,563,347 B2 | 5/2003 | Doyle et al. | |
| 6,701,258 B2 | 3/2004 | Kramb et al. | |
| 6,704,659 B1 | 3/2004 | Lee et al. | |
| 6,831,551 B2 | 12/2004 | Davenport et al. | |

(Continued)

*Primary Examiner* — Marc Duncan
(74) *Attorney, Agent, or Firm* — Cantor Colburn LLP; Ian McKinnon

(57) ABSTRACT

Exemplary embodiments include a sequential and concurrent status detection and evaluation method for multiple processor cores, including receiving data from a plurality of processor cores, for each of the plurality of processor cores, simultaneously running a built-in self test to determine if each of the plurality of cores has failed, checking the data for a dominant logic state and recording a subset of the plurality of processor cores that have failed.

25 Claims, 12 Drawing Sheets

(56) References Cited

U.S. PATENT DOCUMENTS

| | | |
|---|---|---|
| 6,886,107 B2 | 4/2005 | Walsh et al. |
| 6,901,126 B1 | 5/2005 | Gu |
| 6,937,527 B1 | 8/2005 | Lotz et al. |
| 7,130,703 B2 | 10/2006 | Ott et al. |
| 7,149,674 B1 | 12/2006 | Sirichotiyakul et al. |
| 7,154,962 B2 | 12/2006 | Cangiani et al. |
| 7,179,690 B2 | 2/2007 | Lotz et al. |
| 7,263,642 B1 * | 8/2007 | Makar et al. ............ 714/736 |
| 7,689,884 B2 * | 3/2010 | Seuring .................... 714/729 |
| 7,900,086 B2 * | 3/2011 | Datta et al. ................ 714/11 |
| 8,030,649 B2 * | 10/2011 | Gschwind ................. 257/48 |
| 2002/0046365 A1 * | 4/2002 | Avizienis ................. 714/43 |
| 2002/0060585 A1 | 5/2002 | Doyle et al. |
| 2002/0075907 A1 | 6/2002 | Cangiani et al. |
| 2002/0099972 A1 | 7/2002 | Walsh et al. |
| 2003/0212498 A1 | 11/2003 | Kramb et al. |
| 2004/0006729 A1 * | 1/2004 | Pendurkar ................. 714/733 |
| 2004/0034476 A1 | 2/2004 | Lee et al. |
| 2004/0120356 A1 | 6/2004 | Davenport et al. |
| 2004/0199813 A1 | 10/2004 | Hillman et al. |
| 2004/0255013 A1 | 12/2004 | Ott et al. |
| 2005/0138479 A1 * | 6/2005 | Awada et al. ............. 714/38 |
| 2005/0180652 A1 | 8/2005 | Zhu |
| 2005/0180654 A1 | 8/2005 | Zhu |
| 2005/0265089 A1 | 12/2005 | Lotz et al. |
| 2006/0010352 A1 * | 1/2006 | Mukherjee et al. ........ 714/47 |
| 2006/0277991 A1 | 12/2006 | Dahan |
| 2008/0023700 A1 * | 1/2008 | Gschwind ................. 257/48 |
| 2008/0040694 A1 * | 2/2008 | Acuna et al. ............. 716/4 |
| 2008/0229166 A1 * | 9/2008 | Datta et al. ............. 714/735 |
| 2008/0301511 A1 * | 12/2008 | Miller et al. ............ 714/733 |
| 2009/0158088 A1 * | 6/2009 | Hillman et al. ........... 714/11 |
| 2011/0209021 A1 * | 8/2011 | Sorensen et al. ........... 714/733 |

* cited by examiner

DYNAMIC DETECTION AND IDENTIFICATION OF THE FUNCTIONAL STATE OF MULTI-PROCESSOR CORES

BACKGROUND

The present invention relates to multi-core processor architecture, and more specifically, to systems and methods for dynamically detecting and identifying failing cores in a multi-core processor test environment.

A multi-core processor is a processing system composed of two or more functionally independent cores. The cores are typically integrated onto a single integrated circuit die or they may be integrated onto multiple dies in a single chip package. A many-core processor is one in which the number of cores is large enough that traditional multi-processor test and performance evaluation techniques are no longer efficient. This threshold is somewhere in the range of several tens of cores and can require self-diagnostics to determine if any of the cores are failing. Multi-core architecture with built-in self-test (BIST) has become a design trend for VLSI chips due to their needs of high performance and high reliability. Efficient approaches for diagnosing fail cores are thus desirable for yield enhancement.

A problem encountered while concurrently testing multiple cores in a BIST test design environment is to dynamically detect and identify the failing core in real-time and exclude that core from further testing or terminate testing for insufficient number of functional cores. Additionally, an associated problem is to identify the failing test cycle for further diagnostics. It is also desirable to determine dynamic error or detect failures in high reliability communication and data transfer sub-systems. In addition, there persists a generic problem in logic systems to dynamically determine the dominant state of multiple signal bits or data channels. The dominant state is the determination of the majority of the logic state, either "0" or "1", for n-bits at a specific point in time.

SUMMARY

Exemplary embodiments include a sequential processor core status detection method, including receiving data from a plurality of processor cores, for each of the plurality of processor cores, sequentially running a built-in self test to determine if each of the plurality of cores has failed, checking the data for a dominant logic state and recording a subset of the plurality of processor cores that have failed.

Additional embodiments include a computer program product for sequential processor core status detection, the computer program product including instructions stored on a computer readable medium for causing a computer to implement a method, the method including receiving data from a plurality of processor cores, for each of the plurality of processor cores, sequentially running a built-in self test to determine if each of the plurality of cores has failed, checking the data for a dominant logic state and recording a subset of the plurality of processor cores that have failed.

Additional exemplary embodiments include a concurrent processor core status detection method, including receiving data from a plurality of processor cores, while a built-in self test is concurrently testing each of the plurality of processor cores, for each of the processor cores, evaluating a dominant logic state of each of the plurality of processor cores and recording a subset of the plurality of processor cores that have failed.

Further exemplary embodiments include a computer program product for concurrent processor core status detection, the computer program product including instructions stored on a computer readable medium for causing a computer to implement a method, the method including receiving data from a plurality of processor cores, while a built-in self test is concurrently testing each of the plurality of processor cores, for each of the processor cores, evaluating a dominant logic state of each of the plurality of processor cores and recording a subset of the plurality of processor cores that have failed.

Further embodiments include a processor core dynamic status detection system, including a processor configured to receive data from a plurality of processor cores, determine logic states of each of the processor cores from at least one of a sequential built-in self test and a concurrent built-in self-test and record a subset of the plurality of processor cores that have failed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments include systems and methods for dynamically testing a multi-core environment to determine which core(s) are defective and dynamically excluding the core(s) until all defective core(s) are excluded and/or a minimum number of cores suitable for operation are achieved. In exemplary embodiments, a first method for removing defective cores includes sequential evaluation of a BIST test on all cores. In exemplary embodiments, a second method for removing defective core(s) includes concurrently running and evaluating a BIST test on all cores. In the first and second methods, the systems and methods identify faulty signals of a wide concurrent data stream, which can be either a serial or parallel data stream. The systems and methods described herein dynamically exclude faulty lines from further contribution to dominant state determination. The systems and methods described herein implement selective bus sampling, conditional dominant state gating, and dominant width extendibility. As such, the systems and methods described herein dynamically detect dominant logic state of sampled system cycles, allowing real-time voting decisions for large redundant networks. The systems and methods described herein further enable dynamic evaluation of the dominant logic state of a data bus steam by utilizing a novel "bit-swap" logic function block configured in a unique cascading array structure easily expendable to wide signal buses.

Figure 1:
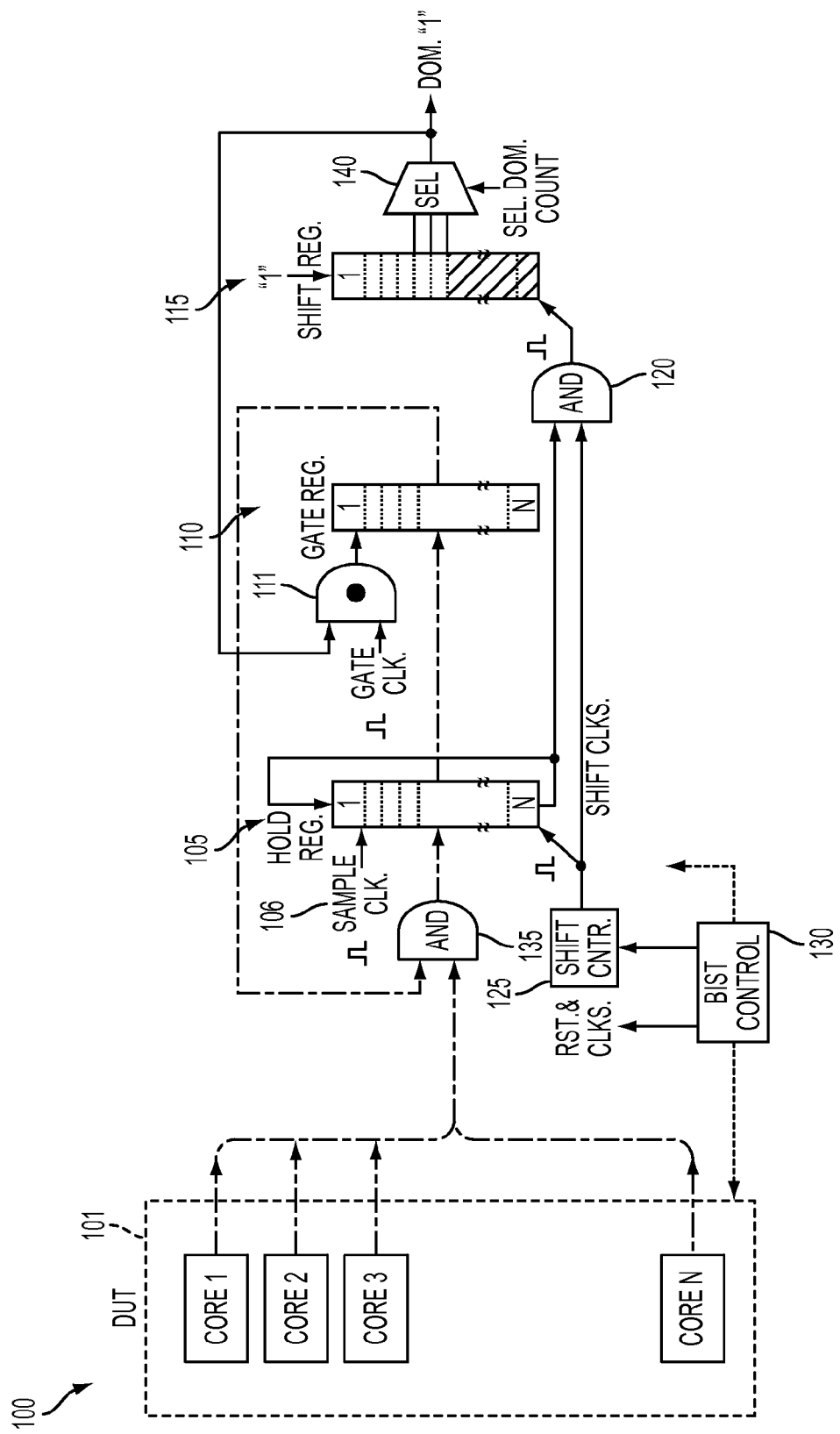
FIG. 1 illustrates system level diagram for a sequential N-bit dominant logic state evaluation function system in accordance with exemplary embodiments.

In exemplary embodiments, the first method includes simultaneously running a BIST test on all cores and sequentially evaluating the pass/fail state of each core for each BIST test cycle. FIG. 1 illustrates system level diagram for a sequential N-bit dominant logic state evaluation function system 100 in accordance with exemplary embodiments. The system 100 implements functions that identified faulty signals of a wide concurrent data stream. A subset of tested vectors is sampled at a predefined interval of the data stream. The sampled vector is temporarily stored while a preferred dominant logic state for the currently valid data lines is determined or evaluated. Once the dominant state is established, each data line is compared to this dominant state. If the specific state of the data line does not match the current dominant state, it is disabled from further analysis. The number of faulty lines can be dynamically monitored to ensure that they meet the minimum requirements or to take appropriate corrective actions if less than the minimum number of functional lines condition is reached.

FIG. 1 illustrates three registers including a hold register 105, a gate register 110 and a shift register 115 that receive data from multiple cores 1-N in a device under test (DUT) 101. The multi-core DUT 101 is being tested by a BIST control 130 with pass/fail status outputs from each core 1-N being evaluated ultimately by a sequential dominant logic state analyzer (A Dominant Count Selector (SEL) 140). (example of dominant "1" pass evaluation) In exemplary embodiments. At the conclusion of a BIST cycle the hold register 105 stores the pass, fail, or status result for each of the N cores, unless that channel's contribution has been excluded by the gate register 110 mask due to a prior fail. A sample clock 106 is generated that simultaneously latches the parallel outputs of the N-data lines into the hold register 105. The gate register 110 is initially set to all '1's prior to the start of BIST. During the BIST run, the gate register 110 is updated by a gate clock 111 and accumulates a history of failed cores (i.e. '0' in this example) identified in the hold register 105. Further input of the failed cores' status is then excluded from input to the hold register 105 on all subsequent BIST cycles by applying the contents of the gate register 110 as a mask. At the start of each BIST cycle, the shift register 115 contents are initialized to '0'. For each Shift Clk cycle received from an AND gate 120 during the dominance evaluation cycles, a '1' is shifted into the shift register 115. At the conclusion of the Shift Clk stream, the shift register 115 contains a stream of contiguous '1's representing the number of passing cores. The AND gate 120 allows the shift clock from a shift counter 125 to propagate to the shift register 115 only if the shifted hold register 105 bit indicates a pass condition (i.e. a '1' in this example). In exemplary embodiments, triggered by a BIST controller 130, the shift counter generates N periods of Shift Clk following the capture of the current BIST result in the hold register 105. The Shift Clks perform a recirculation of the data in the hold register 105 and also clock the shift register 115 for each passing core as identified by the existence of a '1' in the hold register 105. This sequence effectively counts the number of passing cores. An AND gate 135 utilizes the contents of the gate register 110 to apply a mask to the incoming data from the cores, thereby excluding previously failed channels from further BIST cycle evaluation. The SEL 140 can be implemented as a multiplexer (MUX) programmed to tap the contents of the shift register 115 at a position which represents the minimum number of good cores required for a functional machine. A true output from the SEL 140 indicates that the machine is performing satisfactorily, while a false output from the SEL 140 is interpreted as a machine with an unacceptable number of failed cores. At the conclusion of testing, the gate register 110 includes a "0" in the bit position corresponding to the core(s) which fail the tests, determined by an output states that contradicts the majority result.

In the example discussed in FIG. 1, detection of a dominant "1" in the data vectors is discussed as the criterion for determining a pass or fail of individual data lines. It is appreciated that the system 100 can be implemented for a dominant "0" as well. The system 100 of FIG. 1 is readily expandable to process systems of large numbers of data inputs in a sequential manner and to cumulatively record failing data lines for large numbers of test cycles.

Figure 2:
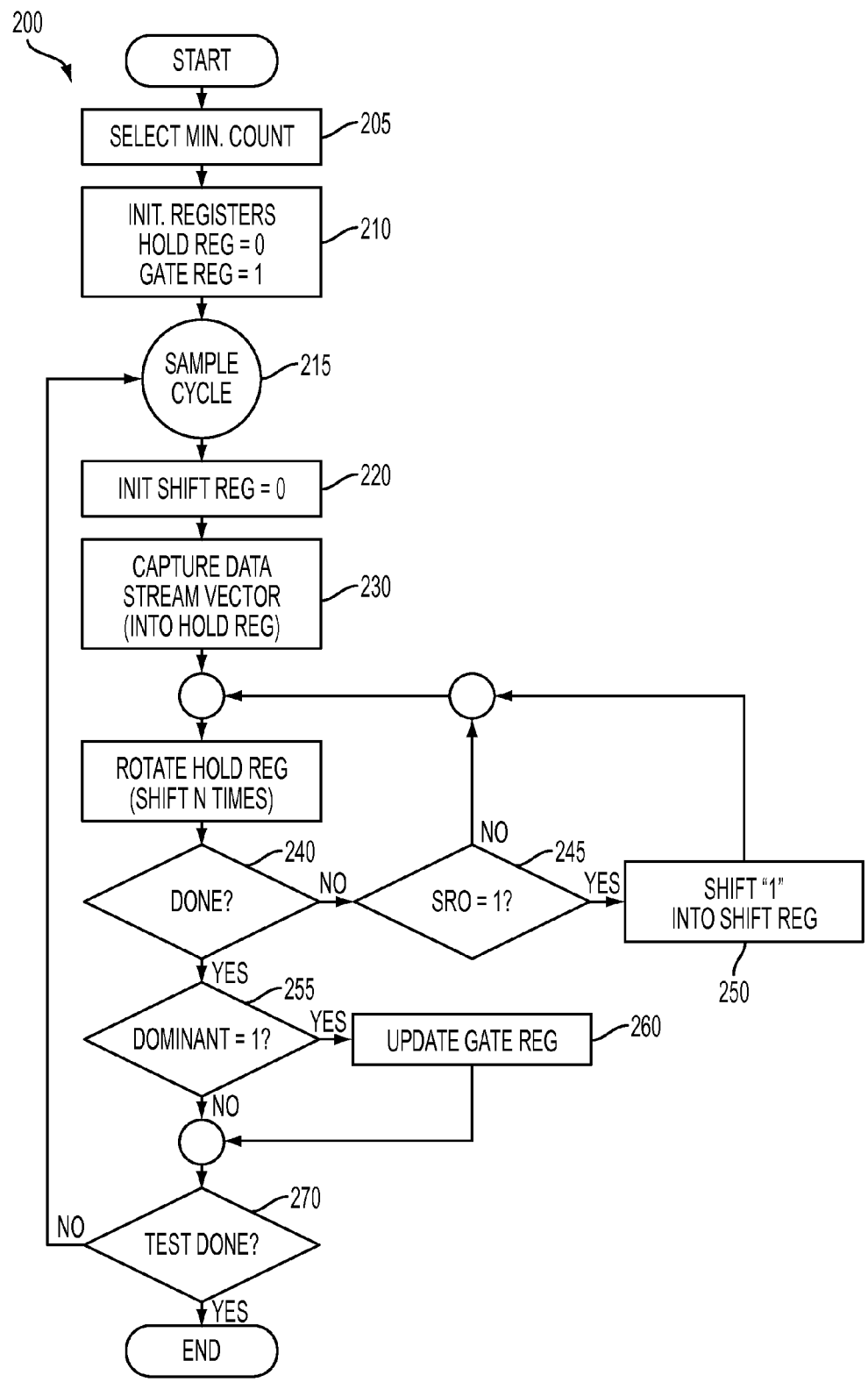
FIG. 2 illustrates a flowchart for a sequential N-bit dominant logic state evaluation method in accordance with exemplary embodiments.
Figure 3:
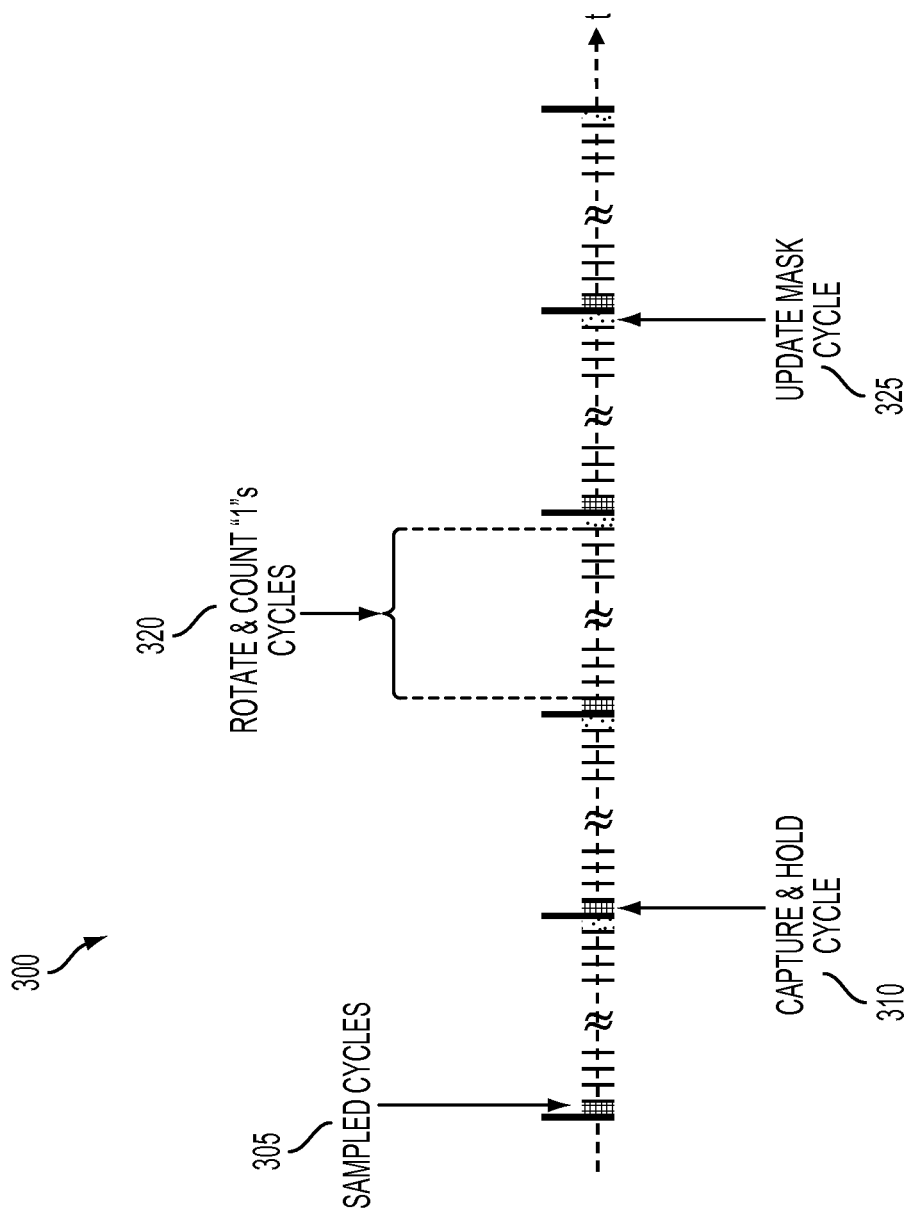
FIG. 3 illustrates an exemplary sequential clock sequence.

FIG. 2 illustrates a flowchart for a sequential N-bit dominant logic state evaluation method 200 in accordance with exemplary embodiments. During an initial set up of the system 100 selects a dominant count criterion at block 205 and initializes the three registers 105, 110, 115 at block 210 and at block 220. The dominant count criterion specifies the minimum number of data lines that must be in agreement in order to identify a passing DUT 101. The minimum count can be user selectable to allow for varying degrees of goodness of the DUT 101. At block 215, the system 100 runs a sample cycle, and the data stream vector is captured at block 225. At the conclusion of a test cycle at block 215, the sample clock 106 is generated that latches the parallel outputs of the N-data lines into the hold register 105. At block 230, N consecutive shift clocks rotate the hold register 105 one bit at a time at block 245 and also shift a "1" into the shift register 115 for each "1" in the data vector at block 250. The system determines if the sequence is complete at block 240. At block 255, the system 100 tests for dominant "1". The gate clock 111 is generated while the dominant "1" line is true at block 255. The gate clock 111 updates the contents of the gate register 110 at block 260 with any corresponding bits from the data vector that disagree with the majority, thereby indicating a fail. Feedback from the gate register 110 bits to the inputs of the hold register 105 assures that fail bits from the current cycle are preserved in subsequent test cycles by masking incoming data on those lines. The systems than determines if the test is done at block 270. Prior to a start of a next cycle, the shift register 115 is set to zeros again at block 220. A clock sequence 300 to accomplish dominant state evaluation for any number of test cycles is illustrated in FIG. 3, which illustrates sampled cycles 305, a capture and hold cycle and reset the shift register 310, the rotate and count "1"s cycle 320 and the update and mask cycle 325 as described in FIG. 2.

Figure 4:
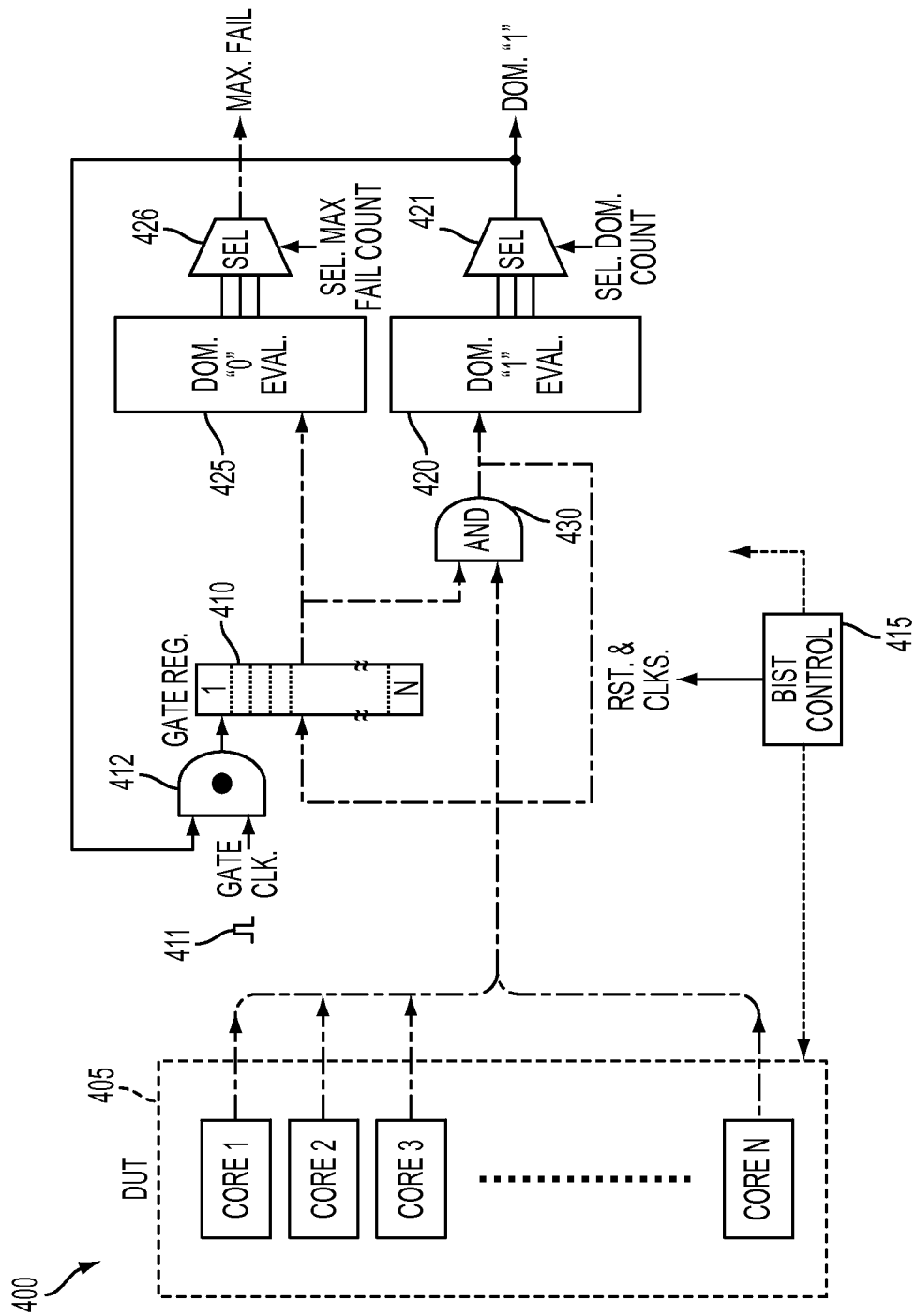
FIG. 4 illustrates system level diagram for a concurrent multi-core BIST system in accordance with exemplary embodiments.

As described above, in exemplary embodiments, the second method includes concurrently running a BIST test on all cores and evaluating the pass/fail state of each core for each BIST test cycle. FIG. 4 illustrates system level diagram for a concurrent multi-core BIST system 400 in accordance with exemplary embodiments. The system 400 is adaptive and is implemented in conjunction with BIST methods to facilitate concurrent testing of large arrays of integrated cores. In exemplary embodiments, the system 400 includes a designed for test (DFT) function that dynamically monitors the stream of responses from multiple cores being simultaneously tested. The system 400 includes a dominant or majority logic state evaluation function for the response stream bus under observation. The system 400 also dynamically updates a register for each sampled cycle that maintains a cumulative mask for each core that does not match the majority state. The system 400 further determines when the number of cores falls below the minimum number of cores required for a functional device, which in turn is used to terminate testing prior to completing a full BIST run. Upon completion, a mask register can be interrogated to determine a number of passing vs. failing cores.

FIG. 4 illustrates that an equivalent BIST can be run on all cores concurrently, implement real time streams to compare cores and compare common mode stream and reject cores that fail majority comparison. The system 400 includes a DUT 405 having cores 1-N. As described herein the cores 1-N operate simultaneously and each provide a pass, fail or status indicator (1 or 0) in response to the BIST. A BIST control 415 runs BIST test on all N-cores, controls clocking & voting sequence, On reset, sets all gate register latches to logic '1'. For illustrative purposes the BIST control 415 executes equivalent tests, cycle-by-cycle on all the cores in parallel or simultaneously (i.e. all the cores 1-N see the same test stimuli and respond with equivalent pass or fail response for each test cycle). A gate register 410 is implemented to cumulatively maintain the pass/fail state of each core 1-N and to gate or mask failing cores from further analysis during remaining test cycles. Initially, the gate register 410 can be set to all "1s" and then is updated with gated data only when the majority state is "1". As described herein, a majority "0" can also be implemented. The contents of the gate register 410 can also be used to identify and configure the passing and failing cores at the end of a BIST test. A dominant "1" evaluation block 420 evaluates and determines the number of passing cores that are in a "1" state. The output of the block 420 is compared to a preset dominant count and if equal or greater, the block 420 sets a Dom "1" signal to "1". The signal is fed back to allow a gate register clock 411 to load the gate register 410 in preparation for a next cycle. A clock AND gate 412 and the gate register 410 accumulate the failing core state throughout the BIST test. Initially the gate register 410 is reset to all '1's or all cores passing state. When one or more cores fails the test on any cycle, as determined by the block 420, the corresponding core bit in the gate register 410 is set to '0'. These failing states are set only if the number of failing cores exceeds the preset 'Dominant count'. The contents of the gate register 410 are also used as input to the block 425 to determine if the maximum number of cores has failed. Alternatively, the Dom "0" evaluation block 425 determines the number of failing cores observed from the gate register 410. If the failing cores exceed the predetermined maximum count, the test can be terminated. For illustrative purposes, the example illustrates the dominant "1" cycles for the test. Both the blocks 420, 425 feed corresponding selectors (SEL) 421, 426. The SEL 426 selects the desired outputs and enables the maximum failing core count indication. Similarly, the SEL 421 enables the dynamic dominant count for the current BIST cycle. The dynamic SEL output is also fed back to the gate register 410 as a clock gate for loading the failing cores into the gate register for each test cycle. A clock AND gate 430 allows only the previous cycles' passing core status bit to propagate to the block 420, while inhibiting failing cores to be considered for further evaluation. This process repeats each cycle until the predefined number of 'Max. Fail' cores is reached or sufficient diagnostic pass/fail data is collected. Additional functionality of the blocks 420, 425 is described further herein.

Figure 5:
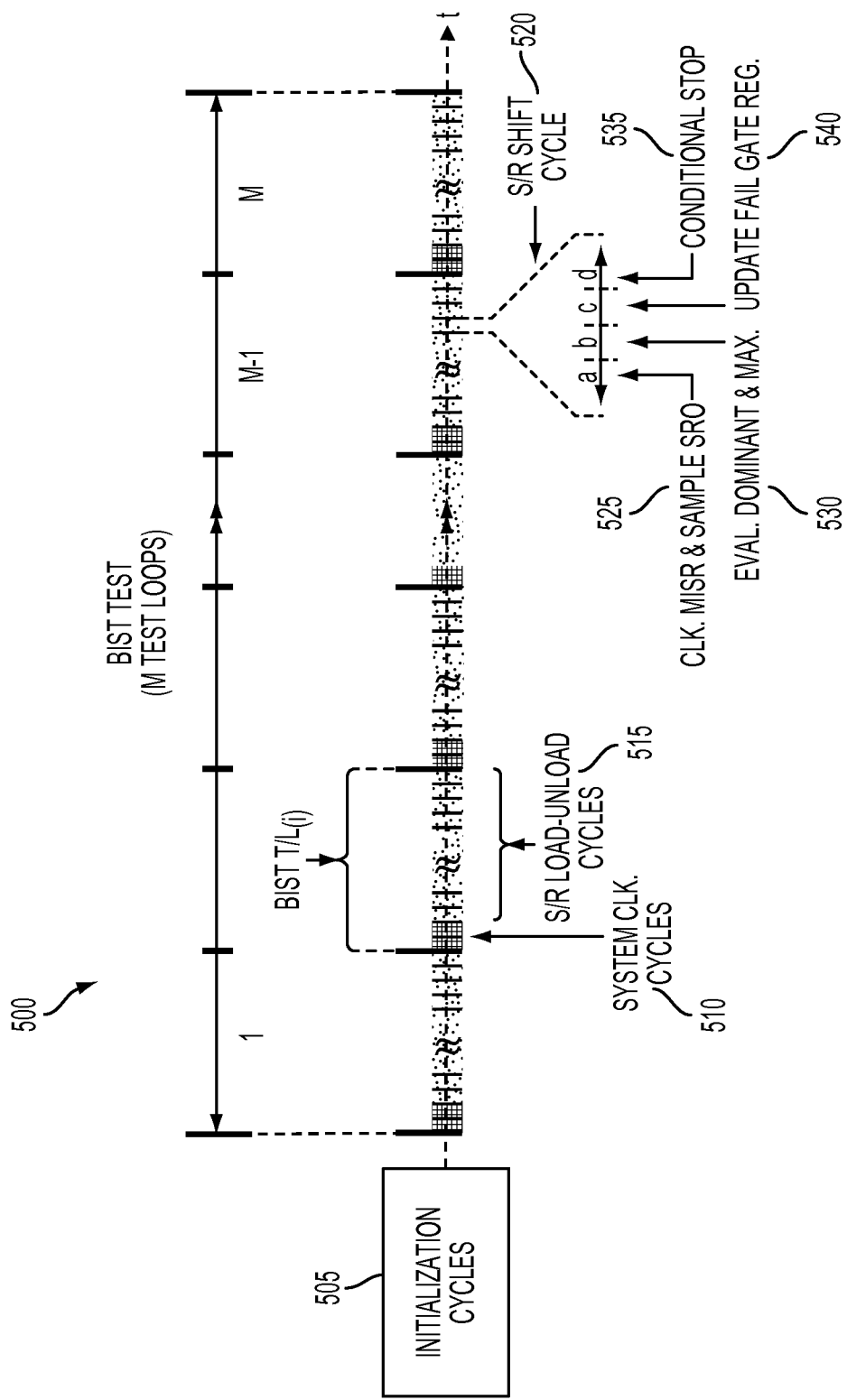
FIG. 5 illustrates a BIST test concurrent time sequence in accordance with exemplary embodiments.

FIG. 5 illustrates a BIST test concurrent time sequence 500 for M test loops in accordance with exemplary embodiments. Each load-unload scan cycle for the cores is expanded to illustrate a sequence of the methods described with respect to FIG. 4. The sequence includes the initialization cycles as further described herein. System clock cycles 510 are performed prior to S/R load-unload cycles 515. For a shift register (S/R) shift cycle 520, a clk misr and sample SRO 525 is performed. In addition, an evaluation of a dominant and maximum number of cores 530 is performed for the S/R shift cycle 520. The S/R shift cycle 520 further include a conditional stop 535 and an update 540 of the failed gate register 410.

Figure 6:
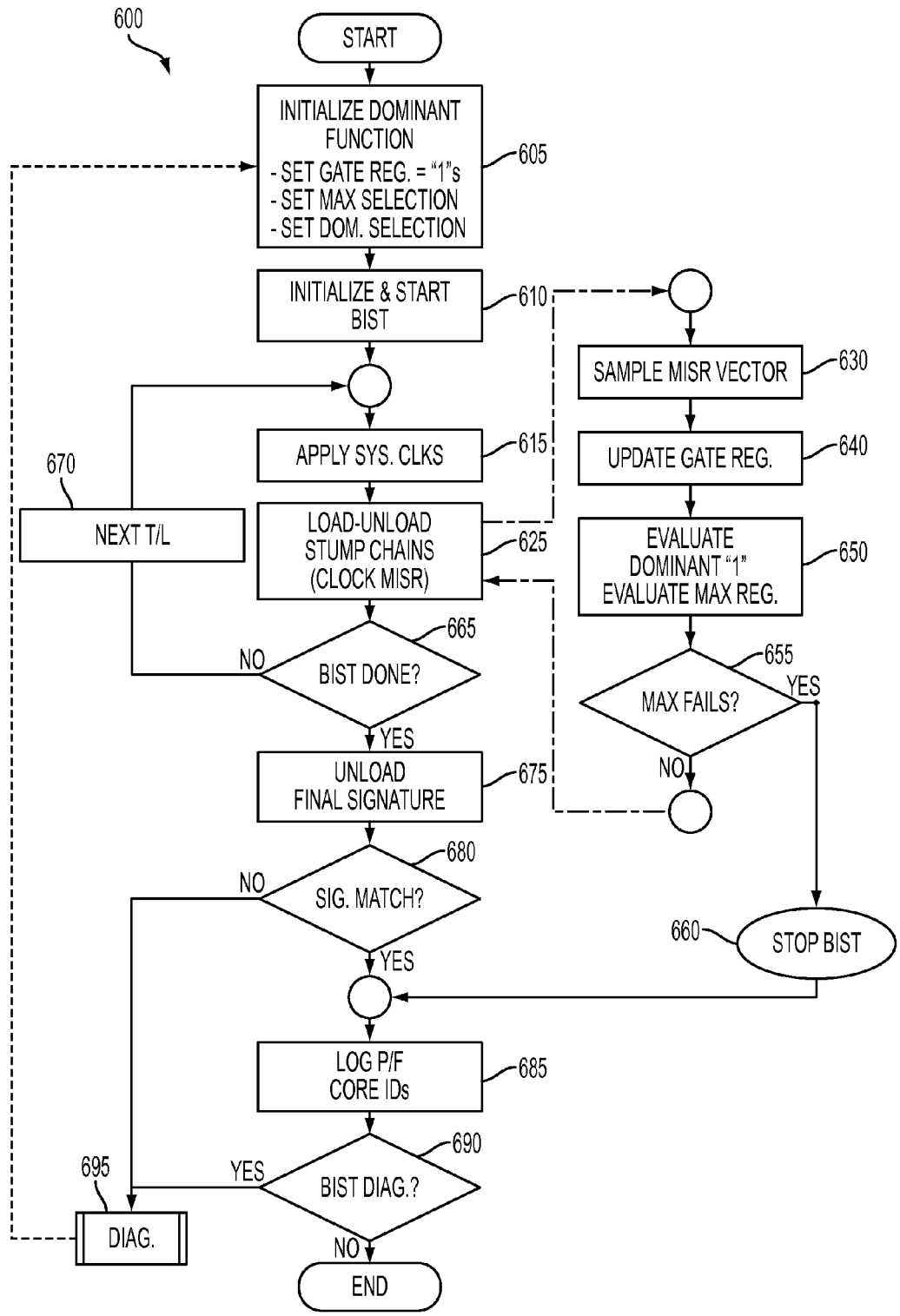
FIG. 6 illustrates a flowchart for a concurrent multi-core BIST method in accordance with exemplary embodiments.

FIG. 6 illustrates a flowchart for a concurrent multi-core BIST method 600 in accordance with exemplary embodiments. At block 605, the system 400 is initialized, which can include setting an initial value to the gate register 410, setting a maximum section and setting a maximum dominant selection. At block 610, the system 400 initializes and starts the BIST. At block 610, the system 400 applies the system clocks and loads/unloads Self Test using MISR and Parallel SRSG (STUMP) chains. At block 630, the data vector is sampled, at block 640 the gate register 410 is updated, and at block 650, the dominant "1" is evaluated, including an evaluation of the maximum selection. If the maximum fails at block 655, the BIST stops at block 660. At block 665, the system 400 determines if the BIST is done. If the BIST is not done at block 665, then the next core is evaluated at block 615-665 and the method continues at blocks 670 and 615. If the BIST is complete at block 665, then at block 675, the system 400 unloads the final readings and a signal match is determined at block 680. If there is no signal match at block 680, then the match is diagnosed at block 695 and the method continues at block 605. If there is a signal match at block 680, then at block 685, the system 400 logs all of the pass/fail data and respective identification of which cores passed and failed. The system 410 then determines if there is a BIST diagnosis at block 690. If there is a BIST diagnosis at block 690, then the method 600 continues at block 695. If there is no BIST diagnosis, then the method 400 completes.

As described above, the blocks 420, 425 are further described. In exemplary embodiments, the blocks 420, 425 are combinatorial circuits for dynamic dominant state evaluation. The block 425 evaluates for dominant '0' condition, while the block 420 evaluates for a dominant '1'. The blocks 420, 425 are discussed further herein with respect to FIGS. 9-12. The dominant state evaluation functions can generate several outputs depending on the desired number of dominant state units that are required for limit comparison (i.e. the block 420 evaluates, on a cycle-by-cycle basis, the number of cores that have failed ('1'-state) during the BIST test, while the block 425 evaluates the cumulative no. of failing cores ('0'-state) for the entire BIST test. The blocks 420, 425 are discussed further herein with respect to FIGS. 9-12. In exemplary embodiments, the blocks 420, 425 implement a "swap block" to collect all "0" bits and all "1" bits occurring in the multiple signal logic and to move the bits into ordered positions, which facilitates the identification of a dominant state. Several swap block structures can be implemented to configure diverse logic networks to minimize delays. As such, the blocks 420, 425 are implemented for dynamic detection of a dominant logic state in a single system cycle allowing for real-time voting decisions for large redundant networks.

Figure 7:
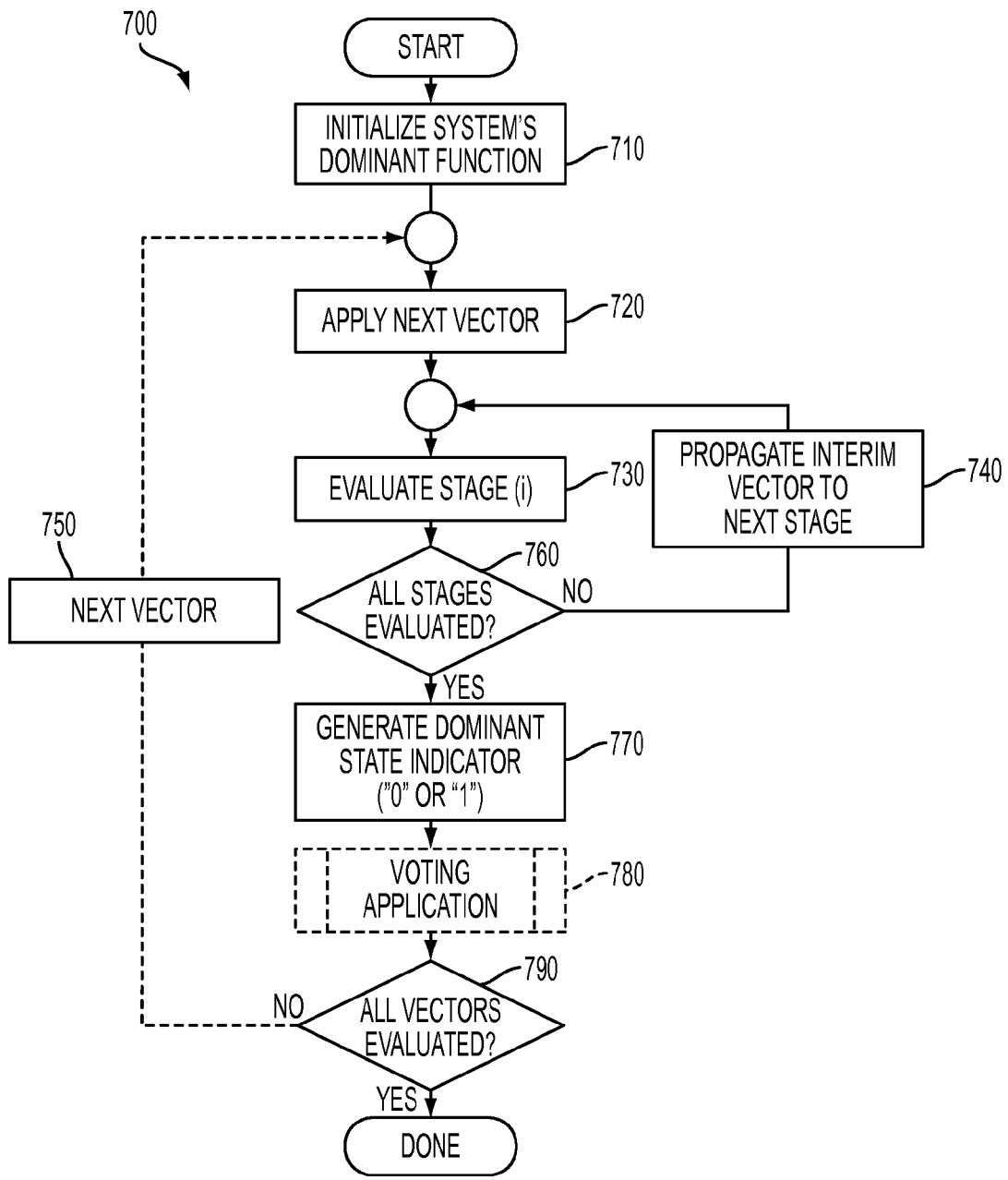
FIG. 7 illustrates a flow chart for a method of dynamic evaluation flow in accordance with exemplary embodiments.

FIG. 7 illustrates a flow chart for a method 700 of dynamic evaluation flow implemented by the blocks 420, 425 in accordance with exemplary embodiments. The method 700 is implemented in conjunction with the system 400 illustrated in FIG. 4. At block 710, the system 400 is initialized. At block 720, the first and subsequent vectors are applied as discussed further with respect to FIG. 6. At block 730, each stage is evaluated. At block 760, the system 400 determines if all the stages are evaluated. If all of the stages have not been evaluated at block 760, then the interim vector is propagated to the next stage at block 740 and the method 700 continues at block 730. If all stages are completed at block 760, then at block 770, the blocks 420, 425 generate the dominant state indicator (either a "0" or a "1"). At block 780, the blocks 420, 425 implement a voting application to determine a dominant logic state. It is contemplated that many well-known voting applications can be implemented at block 780. At block 790, the system 400 determines if all vectors have been evaluated. If all vectors have not been evaluated at block 790, then the method continues at block 720. If all vectors have been evaluated at block 790, then the method 700 terminates.

Figure 8:
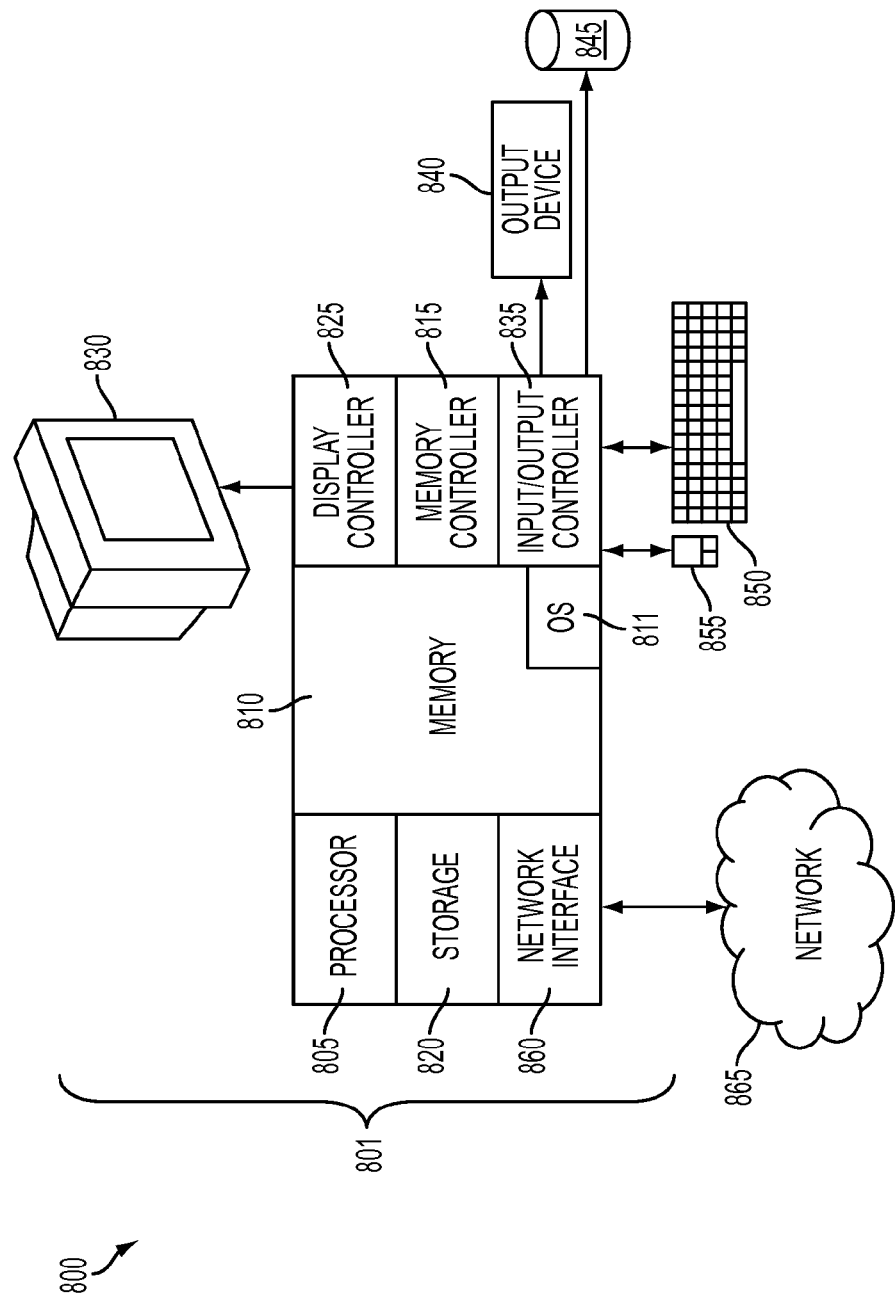
FIG. 8 illustrates an exemplary embodiment of a system for dynamic evaluation of processor cores.

The systems and methods described herein can be implemented on any suitable processing system such as a computer as now described. FIG. 8 illustrates an exemplary embodiment of a system 800 for dynamic evaluation of processor cores. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 800 therefore includes general-purpose computer 801.

In exemplary embodiments, in terms of hardware architecture, as shown in FIG. 8, the computer 801 includes a processor 805, memory 810 coupled to a memory controller 815, and one or more input and/or output (I/O) devices 840, 845 (or peripherals) that are communicatively coupled via a local input/output controller 835. The input/output controller 835 can be, but is not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 805 is a hardware device for executing software, particularly that stored in memory 810. The processor 805 can be any custom made or commercially available processor, a central processing unit (CPU), an auxiliary processor among several processors associated with the computer 801, a semiconductor based microprocessor (in the form of a microchip or chip set), a macroprocessor, or generally any device for executing software instructions.

The memory 810 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, and/or other types of storage media. Note that the memory 810 can have a distributed architecture, where various components are situated remote from one another, but can be accessed by the processor 805.

The software in memory 810 may include one or more separate programs, each of which comprises an ordered listing of executable instructions for implementing logical functions. In the example of FIG. 8, the software in the memory 810 includes the dynamic evaluation methods described herein in accordance with exemplary embodiments and a suitable operating system (OS) 811. The operating system 811 essentially controls the execution of other computer programs, such the dynamic evaluation systems and methods as described herein, and provides scheduling, input-output control, file and data management, memory management, and communication control and related services.

The dynamic evaluation methods described herein may be in the form of a source program, executable program (object code), script, or any other entity comprising a set of instructions to be performed. When a source program, then the program needs to be translated via a compiler, assembler, interpreter, or the like, which may or may not be included within the memory 810, so as to operate properly in connection with the OS 811. Furthermore, the dynamic evaluation methods can be written as an object oriented programming language, which has classes of data and methods, or a procedure programming language, which has routines, subroutines, and/or functions.

In exemplary embodiments, a conventional keyboard 850 and mouse 855 can be coupled to the input/output controller 835. Other output devices such as the I/O devices 840, 845 may include input devices, for example but not limited to a printer, a scanner, microphone, and the like. Finally, the I/O devices 840, 845 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 800 can further include a display controller 825 coupled to a display 830. In exemplary embodiments, the system 800 can further include a network interface 860 for coupling to a network 865. The network 865 can be an IP-based network for communication between the computer 801 and any external server, client and the like via a broadband connection. The network 865 transmits and receives data between the computer 801 and external systems. In exemplary embodiments, network 865 can be a managed IP network administered by a service provider. The network 865 may be implemented in a wireless fashion, e.g., using wireless protocols and technologies, such as WiFi, WiMax, etc. The network 865 can also be a packet-switched network such as a local area network, wide area network, metropolitan area network, Internet network, or other similar type of network environment. The network 865 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 801 is a PC, workstation, intelligent device or the like, the software in the memory 810 may further include a basic input output system (BIOS) (omitted for simplicity). The BIOS is a set of essential software routines that initialize and test hardware at startup, start the OS 811, and support the transfer of data among the hardware devices. The BIOS is stored in ROM so that the BIOS can be executed when the computer 801 is activated.

When the computer 801 is in operation, the processor 805 is configured to execute software stored within the memory 810, to communicate data to and from the memory 810, and to generally control operations of the computer 801 pursuant to the software. The dynamic evaluation methods described herein and the OS 811, in whole or in part, but typically the latter, are read by the processor 805, perhaps buffered within the processor 805, and then executed.

When the systems and methods described herein are implemented in software, as is shown in FIG. 8, the methods can be stored on any computer readable medium, such as storage 820, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the dynamic evaluation methods are implemented in hardware, the dynamic evaluation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Figure 9:
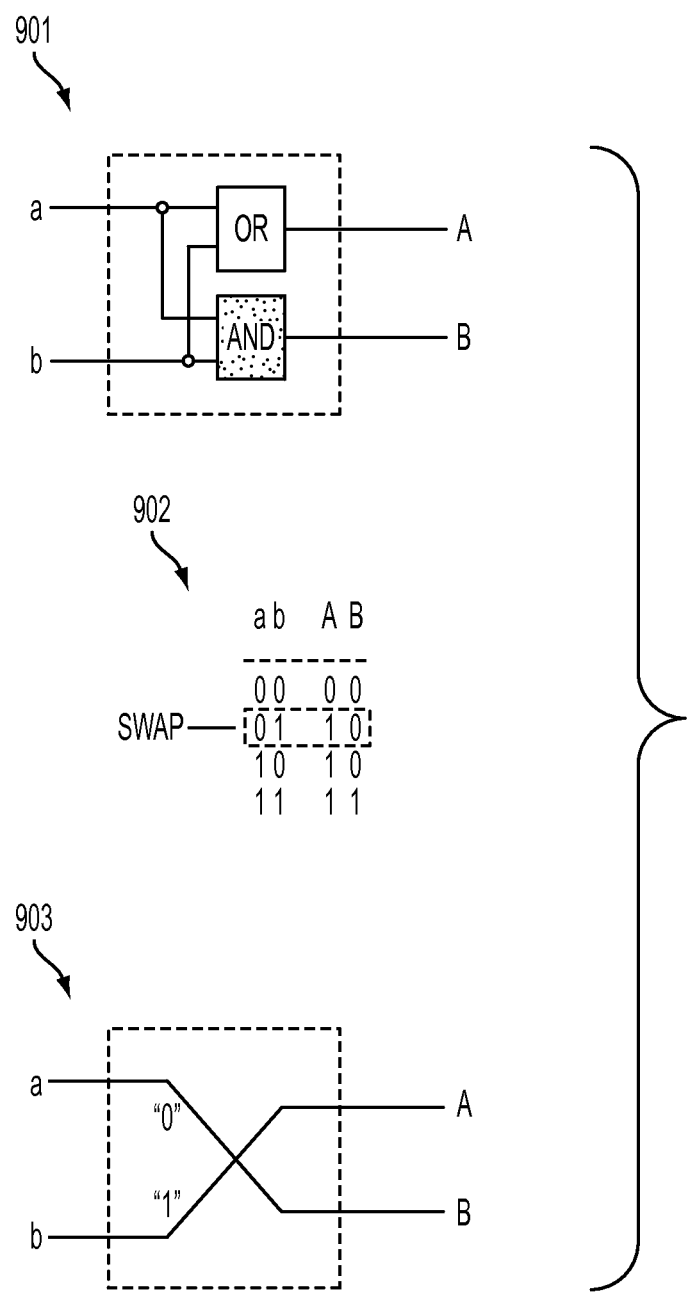
FIG. 9 illustrates a basic 2w-swap block in accordance with exemplary embodiments.

As described herein, swap blocks such as blocks 420, 425 in FIG. 4 are implemented for dominant state evaluation as now described. There are several examples of how the blocks can be implemented, as is discussed herein. A simple combinational two-input, two-output logic block has the property of ordering incoming logic levels such that logic level "1" inputs will propagate to output node A while logic level "0" inputs will propagate to output node B when the inputs a and b receive differential levels. FIG. 9 illustrates a swap block structure 901 of the basic 2-input swap-block consisting of and 2w-AND and 2w_OR elementary logic blocks. FIG. 9 further illustrates a logic truth table 902 for the basic swap-block. Inputs a, b with corresponding outputs A,B. Note that the effect of the swap-block is to "swap" the logic input state such that the output shifts the same logic in the same direction. FIG. 9 further illustrates a functional data flow 903 representation of basic swap-block.

By cascading the basic swap block circuits, a network can readily be developed to sort random logic inputs for any number of data channels desired. Variations of this cascading network can be used to perform the following operations: 1) Detect the condition of at least one "0" on an input line of the network; 2) Detect the condition of at least one "1" on an input line of the network; and 3) Group all logic "1"s and all logic "0"s for majority detection or equality detection.

In another example a 4-input network with three swap blocks cascaded such that a logic "0" on any of the four input lines will be detected by observing a "0" on the D output, as indicated by the "0" shift direction arrow in the drawing.

Figure 10:
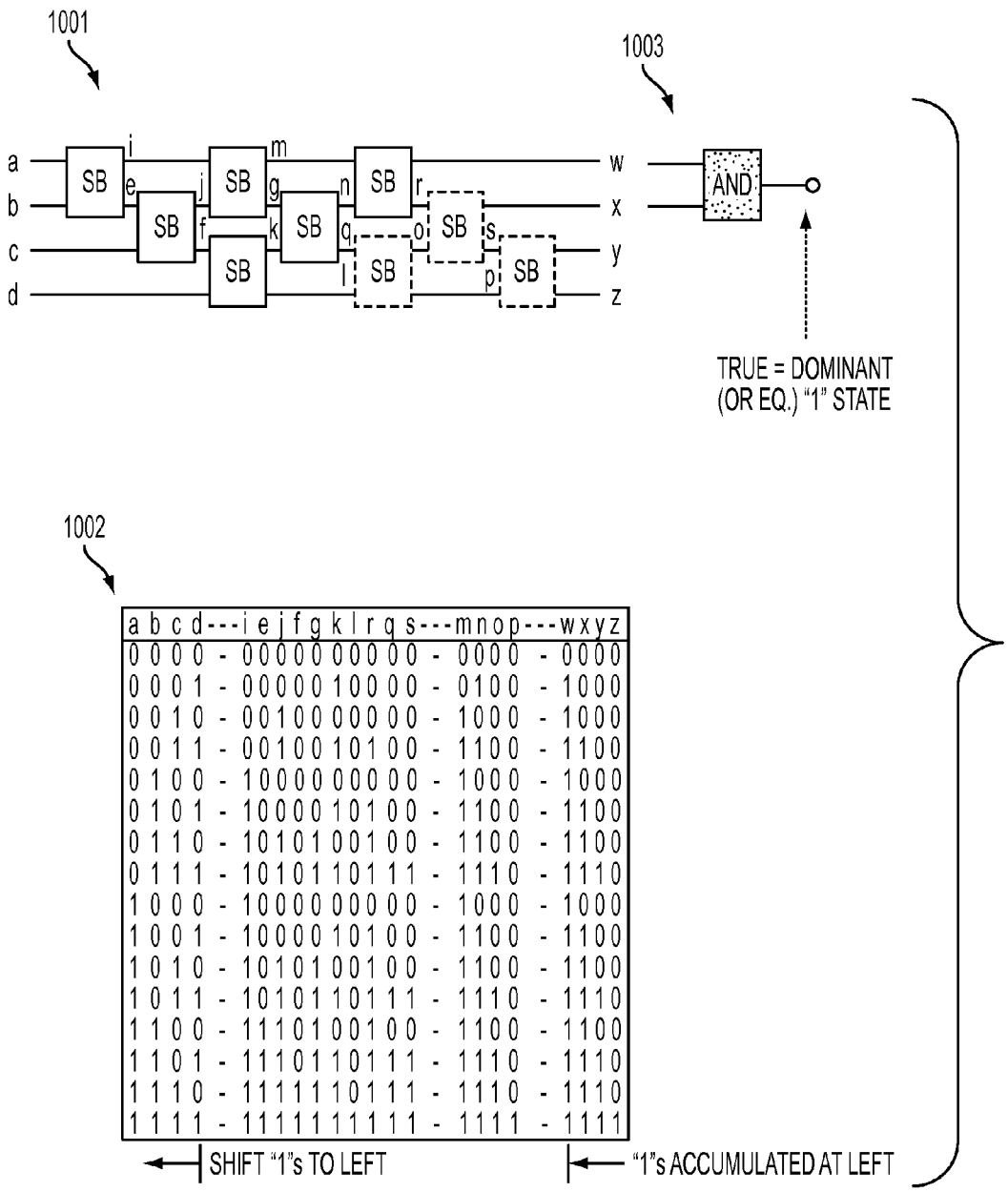
FIG. 10 illustrates a full cascaded 2w-swap (four-input) block in accordance with exemplary embodiments.

FIG. 10 illustrates a structure 1001 of a 4-input swap logic function consisting of several cascaded basic swap-blocks. The "full" indicates that the function implements a full complement of outputs. FIG. 10 further illustrates a logic truth table 1002 for the 4-input swap structure 1001. The columns in the table represent the input and output of each of the basic 2w swap-block in the structure. FIG. 10 further illustrates an implementation of a 2w-AND gate 1003 to generate a true ("1") output for a dominant "1" state for inputs a,b,c,d.

Figure 11:
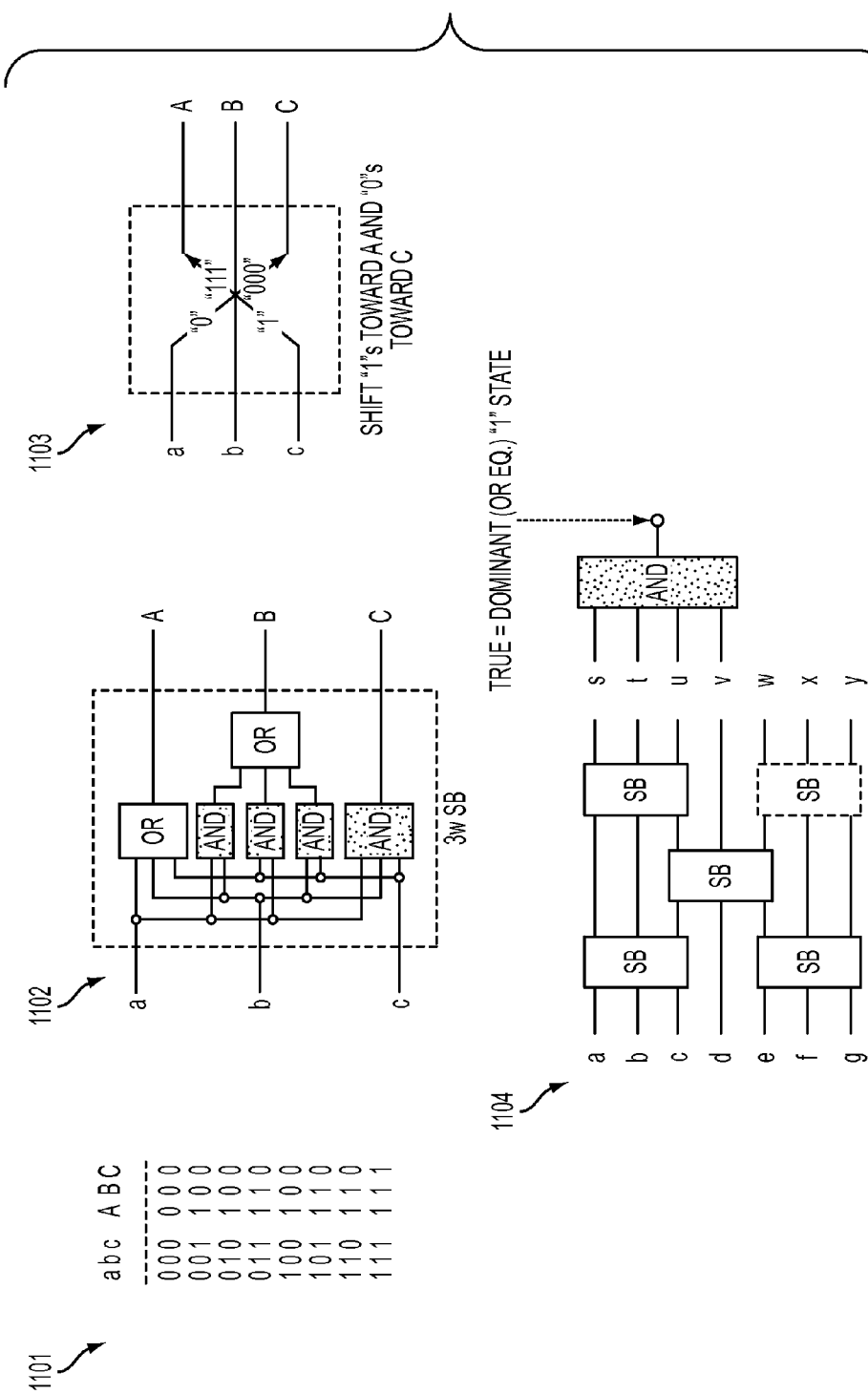
FIG. 11 illustrates a basic 3w-swap block and seven input example block in accordance with exemplary embodiments.

FIG. 11 illustrates a structure 1102 of a 3-input swap logic function consisting of several basic 2w and 3w primary AND & OR elementary blocks. FIG. 11 further illustrates a logic truth table 1101 for the 3-input swap structure 1102. FIG. 11 further illustrates a functional data flow 1103 representation of the 3-input swap structure. FIG. 11 further illustrates an implementation of a 7-input swap 1104 using five 3w swap-blocks described above.

Figure 12:
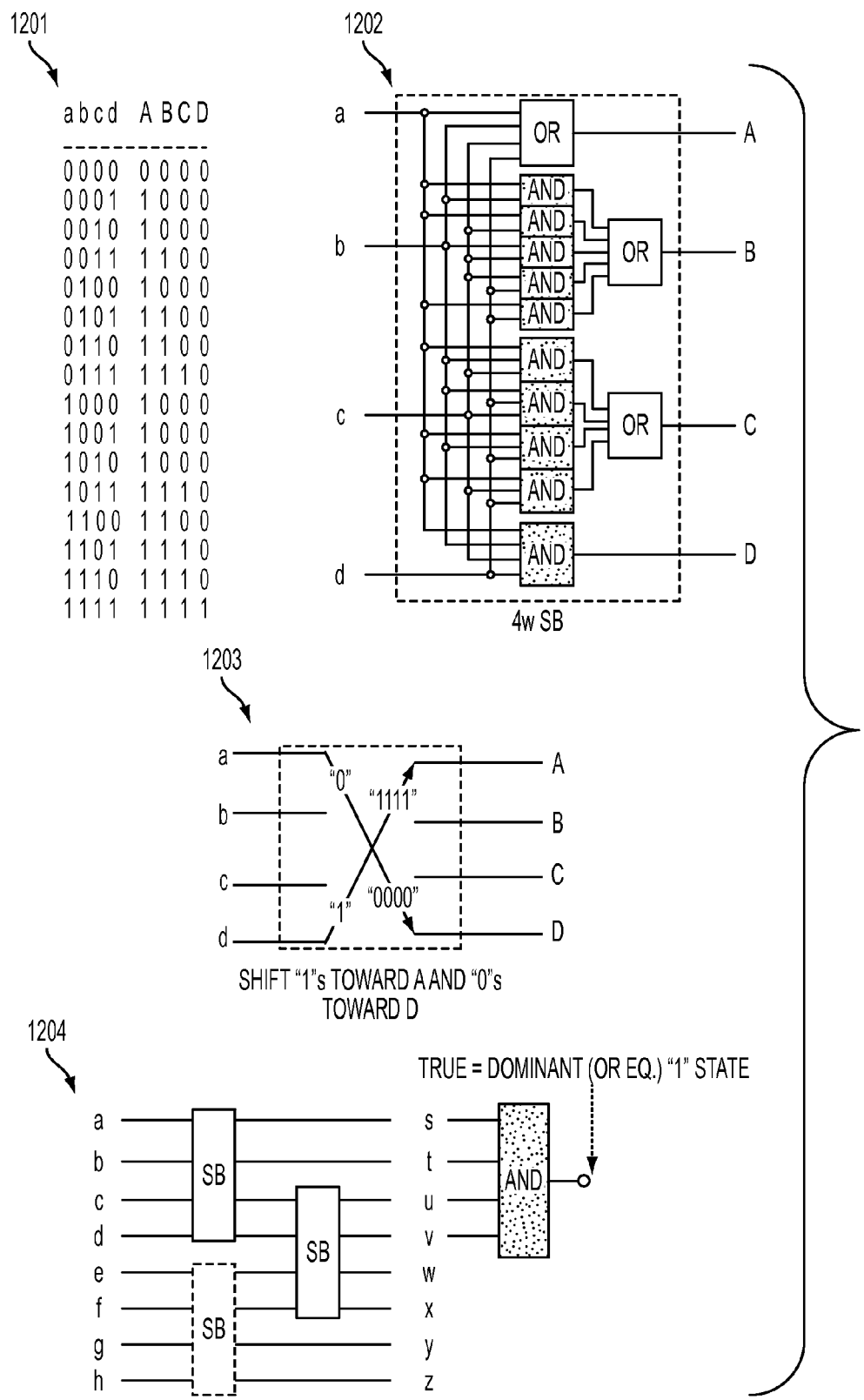
FIG. 12 illustrates a basic 4w-swap block an eight input example in accordance with exemplary embodiments.

FIG. 12 illustrates a logic truth table 1201 for a 4-input swap structure 1201. FIG. 12 further illustrates the structure 1202 of a 4-input swap logic function consisting of several basic 2w and 3w primary AND & OR elementary blocks. FIG. 12 further illustrates a functional data flow 1203 representation of the 4-input swap structure. FIG. 12 further illustrates an implementation of an 8-input swap 1204 using five 4w swap-blocks described above.

Technical effects include implementation of the systems and methods described herein with existing BIST systems without any changes to current hardware. The systems and methods described herein can be applied to long test sequences wherein the BIST test sequence can apply to millions of patterns, with the ability to extend the systems and methods described herein to wide data streams (e.g. 256 core arrays). The systems and methods described herein further eliminate the need for an expected response or signature generation. Power reduction is realized because each failed core is shut off. The systems and methods described herein include adaptive self-repair which allows for good core configuration at test completion via mask registers.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A sequential processor core status detection method, comprising:
   receiving data from a plurality of processor cores;
   for each of the plurality of processor cores, sequentially running a built-in self test to determine if each of the plurality of cores has failed;
   storing bits indicating logic states reflecting results of the built-in self tests in a bit-swap structure comprising a plurality of logical swap blocks;
   checking the data stored the swap blocks to determine a dominant logic state for each processor core;
   identifying one or more of the processor cores as having failed based on the dominant logic states;
   recording a history of those processor cores determined to have failed; and
   excluding from operation those processor cores determined to have failed.

2. The method as claimed in claim 1, wherein the dominant logic state for each processor core reflects results obtained from a large number of long test sequences applied to the processor core.

3. The method as claimed in claim 2 further comprising recording a first logic state for a passed processor core and a second logic state for a failed processor core.

4. The system of claim 1, wherein the bit-swap structure further comprises a cascade of swap blocks.

5. The system of claim 4, wherein each swap block of the cascade defines two logical inputs.

6. The system of claim 4, wherein each swap block of the cascade defines three logical inputs.

7. The system of claim 4, wherein each swap block of the cascade defines four logical inputs.

8. A computer program product for sequential processor core status detection, the computer program product including instructions stored on a non-transitory computer readable medium for causing a computer to implement a method, the method comprising:
receiving data from a plurality of processor cores;
for each of the plurality of processor cores, sequentially running a built-in self test to determine if each of the plurality of cores has failed;
storing bits indicating logic state reflecting results of the built-in self tests in a bit-swap structure comprising a plurality of swap blocks;
checking the data stored the swap blocks to determine a dominant logic state for each processor core;
identifying one or more of the processor cores that have failed based on the dominant logic states;
recording a history of those processor cores determined to have failed; and
excluding from operation those processor cores determined to have failed.

9. The computer program product as claimed in claim 8 wherein the dominant logic state for each processor core reflects results obtained from a large number of long test sequences applied to the processor core.

10. The computer program product as claimed in claim 9, wherein the method further comprises recording a first logic state for a passed processor core and a second logic state for a failed processor core.

11. A concurrent processor core status detection method, comprising
receiving data from a plurality of processor cores;
for the plurality of processor cores, concurrently running a built-in self test to determine if each of the plurality of cores has failed;
storing bits indicating logic state reflecting results of the built-in self tests in a bit-swap structure comprising a plurality of logical swap blocks;
checking the data stored the swap blocks to determine a dominant logic state for each processor core;
identifying one or more of the processor cores that have failed based on the dominant logic states;
recording a history of those processor cores determined to have failed; and
excluding from operation those processor cores determined to have failed.

12. The method as claimed in claim 11 further comprising running a voting sequence to determine a dominant logic state, wherein the dominant logic state determines whether a predetermined number of failed cores has been reached.

13. The method as claimed in claim 11 further comprising determining a number of processor cores that have failed as each of the plurality of processor cores is tested.

14. The method as claimed in claim 11 further comprising determining a cumulative number of processor cores that have failed.

15. The method as claimed in claim 11 further comprising inhibiting failed processor cores of the plurality of processor cores for further testing by the built-in self test.

16. A computer program product for concurrent processor core status detection, the computer program product including instructions stored on a non-transitory computer readable medium for causing a computer to implement a method, the method comprising:
receiving data from a plurality of processor cores;
for the plurality of processor cores, concurrently running a built-in self test to determine if each of the plurality of cores has failed;
storm bits indicating logic state reflecting results of the built-in self tests in a bit-swap structure comprising a plurality of logical swap blocks;
checking the data stored the swap blocks to determine a dominant logic state for each processor core;
identifying one or more of the processor cores that have failed based on the dominant logic states;
recording a history of those processor cores determined to have failed; and
excluding from operation those processor cores determined to have failed.

17. The computer program product as claimed in claim 16, wherein the method further comprises running a voting sequence to determine a dominant logic state, wherein the dominant logic state determines whether a predetermined number of failed cores has been reached.

18. The computer program product as claimed in claim 16, wherein the method further comprises determining a number of processor cores that have failed as each of the plurality of processor cores is tested.

19. The computer program product as claimed in claim 16, wherein the method further comprises determining a cumulative number of processor cores that have failed.

20. The computer program product as claimed in claim 16, wherein the method further comprises inhibiting failed processor cores of the plurality of processor cores for further testing by the built-in self test.

21. A processor core dynamic status detection system, comprising:
a processor configured to:
receive data from a plurality of processor cores;
store bits indicating logic state reflecting results of the built-in self tests in a bit-swap structure comprising a plurality of logical swap blocks;
check the data stored the swap blocks to determine logic states of each of the processor cores;
identify one or more of the processor cores that have failed based on the dominant logic states;
record a history of those processor cores determined to have failed; and
exclude from operation processor cores determined to have failed.

22. The system as claimed in claim 21, wherein the processor is further configured to obtain results from a large number of long test sequences applied to each processor core to determine if each of the plurality of cores has failed.

23. The system as claimed in claim 22, wherein the processor is further configured to record a first logic state for a passed processor core and a second logic state for a failed processor core.

24. The system as claimed in claim 21, wherein the processor is further configured to evaluate a dominant logic state of each of the plurality of processor cores; and store a record indicating those processor cores that have failed.

25. The system as claimed in claim 24, wherein the processor is further configured to run a voting sequence to determine a dominant logic state, wherein the dominant logic state determines whether a predetermined number of failed cores has been reached.

\* \* \* \* \*